(12) United States Patent
Kumagai et al.

(10) Patent No.: US 8,938,952 B2
(45) Date of Patent: Jan. 27, 2015

(54) ELECTRIC HEATING CATALYST

(75) Inventors: Noriaki Kumagai, Susono (JP); Mamoru Yoshioka, Susono (JP); Naoya Takagi, Mishima (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 741 days.

(21) Appl. No.: 13/146,267

(22) PCT Filed: Aug. 24, 2010

(86) PCT No.: PCT/JP2010/064283
§ 371 (c)(1),
(2), (4) Date: Jul. 26, 2011

(87) PCT Pub. No.: WO2012/025993
PCT Pub. Date: Mar. 1, 2012

(65) Prior Publication Data
US 2012/0047881 A1 Mar. 1, 2012

(51) Int. Cl.
*F01N 3/10* (2006.01)
*F01N 3/20* (2006.01)
(Continued)

(52) U.S. Cl.
CPC ............ *F01N 3/2013* (2013.01); *F01N 3/2026* (2013.01); *F01N 3/2853* (2013.01); *B01J 35/0033* (2013.01); *Y02T 10/26* (2013.01); *F01N 2240/16* (2013.01); *F01N 2470/08* (2013.01)
USPC ..................... 60/300; 60/303; 60/309; 60/286

(58) Field of Classification Search
USPC ............ 60/286, 290, 300, 303, 309; 422/174, 422/179
See application file for complete search history.

(56) References Cited

U.S. PATENT DOCUMENTS 4,976,929 A * 12/1990 Cornelison et al. ............ 422/174
5,070,694 A    12/1991 Whittenberger
5,177,961 A *  1/1993 Whittenberger ................ 60/300
(Continued)

FOREIGN PATENT DOCUMENTS

CN    102985653 A    3/2013
JP    05-231140 A    9/1993
(Continued)

OTHER PUBLICATIONS

Non-Final Office Action dated Mar. 4, 2014, issued in corresponding U.S. Appl. No. 13/695,532.
(Continued)

*Primary Examiner* — Thomas Denion
*Assistant Examiner* — Patrick Maines
(74) *Attorney, Agent, or Firm* — Sughrue Mion, PLLC

(57) ABSTRACT

The present invention is intended to suppress a decrease in insulation resistance between electrodes and a case in an electric heating catalyst (EHC). An EHC (1) according to the present invention is provided with a heat generation element (3) that is energized to generate heat thereby to heat a catalyst, a case (4) that receives the heat generation element therein, an insulating member (5) that is arranged between the heat generation element (3) and the case (4) for insulating electricity, electrodes (7) that are connected to the heat generation element (3) through an electrode chamber (9) which is a space located between an inner wall surface of the case (4) and an outer peripheral surface of the heat generation element (3), and a ventilation passage (10) that ventilates the electrode chamber.

6 Claims, 8 Drawing Sheets

(51) Int. Cl.
  *F01N 3/28* (2006.01)
  *B01J 35/00* (2006.01)

(56) References Cited

U.S. PATENT DOCUMENTS

| 5,238,650 | A | * | 8/1993 | Sheller et al. ................. 422/174 |
| 5,264,186 | A | | 11/1993 | Harada et al. |
| 5,744,104 | A | * | 4/1998 | Sakurai et al. ................. 422/174 |
| 5,839,276 | A | | 11/1998 | Nishizawa |
| 5,935,473 | A | * | 8/1999 | Hashimoto et al. ............ 219/541 |
| 8,658,103 | B2 | * | 2/2014 | Mutsuda et al. .............. 422/179 |
| 2012/0047881 | A1 | | 3/2012 | Kumagai et al. |
| 2012/0131907 | A1 | * | 5/2012 | Yoshioka et al. ................ 60/276 |
| 2013/0055702 | A1 | * | 3/2013 | Watanabe et al. ............... 60/300 |
| 2013/0156651 | A1 | * | 6/2013 | Yoshioka et al. ............. 422/168 |

FOREIGN PATENT DOCUMENTS

| JP | 5-269387 | A | | 10/1993 | |
| JP | 05269387 | A | * | 10/1993 | ............... B01J 35/04 |
| JP | 5-96424 | U | | 12/1993 | |
| JP | 5-317651 | A | | 12/1993 | |
| JP | 05096421 | U | | 12/1993 | |
| JP | 05317651 | A | * | 12/1993 | ............. B01D 53/36 |
| JP | 06002534 | A | * | 1/1994 | ................ F01N 3/20 |
| JP | 08-210127 | A | | 8/1996 | |
| JP | 2007-239556 | A | | 9/2007 | |
| JP | 2008-014186 | A | | 1/2008 | |
| JP | 2010-71223 | A | | 4/2010 | |
| JP | 2010242724 | A | * | 10/2010 | |
| JP | 2012112302 | A | * | 6/2012 | |

OTHER PUBLICATIONS

Final Office Action dated Jun. 25, 2014, issued in corresponding U.S. Appl. No. 13/695,532.

Notice of Allowance and Fee(s) Due dated Oct. 8, 2014, issued in U.S. Appl. No. 13/695,532.

* cited by examiner

ELECTRIC HEATING CATALYST

CROSS REFERENCE TO RELATED APPLICATIONS

This application is a National Stage of International Application No. PCT/JP2010/064283 filed on Aug. 24, 2010, the contents of all of which are incorporated herein by reference in their entirety.

TECHNICAL FIELD

The present invention relates to an electric heating catalyst that is arranged in an exhaust passage of an internal combustion engine.

BACKGROUND ART

In the past, as an exhaust gas purification catalyst arranged in an exhaust passage of an internal combustion engine, there has been developed an electric heating catalyst (hereinafter referred to as an EHC) in which a catalyst is heated by means of a heat generation element which generates heat by electrical energization thereof.

In the EHC, an insulating member which serves to insulate electricity is arranged between the heat generation element which generates heat by electrical energization thereof, and a case in which the heat generation element is received. For example, in Patent Document 1, there is disclosed a technique in which in an EHC, a mat made of an insulating material is arranged between a carrier which is electrically energized to generate heat and a case in which the carrier is received. Due to the arrangement of such an insulating member, it is possible to suppress the heat generation element and the case from being short-circuited to each other.

PRIOR ART DOCUMENTS

[Patent Documents]
Patent Document 1: Japanese patent application laid-open No. H05-269387
Patent Document 2: Japanese patent application laid-open No. 2010-071223

DISCLOSURE OF THE INVENTION

Problem to be Solved by the Invention

Inside the case of the heat generation element in the EHC, there is formed an electrode chamber which is a space for passing or inserting electrodes connected to the heat generation element. This electrode chamber is formed by being surrounded with the insulating member and the heat generation element.

The exhaust gas which flows in an exhaust pipe permeates into the insulating member and the heat generation element. Into the electrode chamber formed as described above, the exhaust gas, which has passed through the peripheral wall of the heat generation element or the insulating member, comes. Moisture is contained in the exhaust gas, and hence, when the exhaust gas comes into the electrode chamber, condensed water may be generated in the electrode chamber because of condensation of the moisture in the exhaust gas.

In addition, in the exhaust pipe, too, condensed water may be generated due to condensation of the moisture in the exhaust gas on a wall surface of the exhaust pipe. When the condensed water is generated inside the exhaust pipe, it is forced by the exhaust gas to flow along the inner wall surface of the exhaust pipe. Then, at the time the condensed water reaches the EHC, it permeates into the insulating member and the heat generation element. When the condensed water permeates into the insulating member and the heat generation element, it may pass through them and come into the electrode chamber.

If condensed water exists in the electrode chamber, it evaporates therein to generate water vapor. Also, condensed water may evaporate inside the insulating member or the heat generation element, so that it may comes into the electrode chamber in a state of water vapor. When the humidity in the electrode chamber rises with such water vapor, there is a fear that the insulation resistance between the electrodes and the case in the electrode chamber may decrease to a large extent.

The present invention has been made in view of the above problems, and has for its object to suppress a decrease in the insulation resistance between electrodes and a case in an EHC.

Means for Solving the Problem

The present invention is to remove, in an EHC, water vapor and exhaust gas from an electrode chamber by providing a ventilation passage which serves to ventilate the electrode chamber.

More specifically, an EHC according to the present invention resides in an electric heating catalyst which is arranged in an exhaust passage of an internal combustion engine, and which is provided with:

a heat generation element that is electrically energized to generate heat so that a catalyst is heated by the generation of heat;

a case that receives said heat generation element therein;

an insulating member that is arranged between said heat generation element and said case for supporting said heat generation element and insulating electricity;

electrodes that are connected to said heat generation element through an electrode chamber which is a space located between an inner wall surface of said case and an outer peripheral surface of said heat generation element, and which has a side wall surface formed by said insulating member, said electrodes supplying electricity to said heat generation element; and a ventilation passage that ventilates said electrode chamber.

The water vapor and the exhaust gas can be removed from the electrode chamber by ventilating the electrode chamber by way of the ventilation passage. As a result, it is possible to suppress the humidity in the electrode chamber from becoming excessively high. Thus, according to the present invention, it is possible to suppress a decrease in the insulation resistance between the electrodes and the case, which would result from water vapor generated by the evaporation of condensed water.

In the present invention, the ventilation passage may be connected to the electrode chamber. In this case, the water vapor and the exhaust gas can be directly removed from the inside of the electrode chamber. In addition, the ventilation passage may be connected to a part in which the insulating member exists at an upstream side of the electrode chamber. In this case, the water vapor and the exhaust gas before coming into the electrode chamber can be removed. As a result of this, it is possible to suppress the water vapor and the exhaust gas from coming into the electrode chamber. Also, the water vapor and the exhaust gas which have once come into the electrode chamber can be removed through the insulating member.

The electric heating catalyst according to the present invention may be further provided with a temperature acquisition part that serves to acquire a temperature in the electrode chamber. In addition, the electric heating catalyst according to the present invention may be further provided with a ventilation control part that serves to control the execution of ventilation of the electrode chamber.

Then, in cases where the ventilation passage is connected to the electrode chamber, the ventilation control part may carry out the ventilation of the electrode chamber by way of the ventilation passage, when the temperature in the electrode chamber acquired by the temperature acquisition part is higher than a prescribed temperature. Here, the prescribed temperature is a threshold by which a determination can be made that when the temperature in the electrode chamber becomes higher than the prescribed temperature, the humidity in the electrode chamber can be made excessively high due to the water vapor generated by the evaporation of condensed water. The prescribed temperature can be beforehand obtained based on experiments, etc.

In cases where the ventilation passage is connected to the electrode chamber, when ventilation is carried out, there is a possibility that the flow rate of the exhaust gas coming into the electrode chamber may increase. If the flow rate of the exhaust gas coming into the electrode chamber increases, an increase in the condensed water, which is generated in the electrode chamber, will be caused. According to the above, when the temperature in the electrode chamber is equal to or lower than the prescribed temperature, the ventilation of the electrode chamber is not carried out. As a result, an increase in the flow rate of the exhaust gas coming into the electrode chamber accompanying the ventilation thereof can be suppressed as much as possible.

In addition, in cases where the ventilation passage is connected to a part in which the insulating member exists at an upstream side of the electrode chamber, the ventilation control part may start the ventilation of the electrode chamber by way of the ventilation passage at the time of starting of the internal combustion engine. According to this, it is possible to suppress the water vapor and the exhaust gas from coming into the electrode chamber, from the time of the starting of the internal combustion engine. As a result, the generation of water vapor in the electrode chamber after the completion of the starting of the internal combustion engine can be suppressed.

In this embodiment, the ventilation passage may have a first ventilation passage that is connected to the electrode chamber, and a second ventilation passage that is connected to a part in which the insulating member exists at an upstream side of the electrode chamber. In this case, the ventilation control part may carry out the ventilation of the electrode chamber by way of the first ventilation passage when the temperature in the electrode chamber acquired by the temperature acquisition part is higher than said prescribed temperature, and may carry out the ventilation of the electrode chamber by way of the second ventilation passage when said temperature is equal to or lower than said prescribed temperature.

According to this, when the temperature in the electrode chamber is higher than the prescribed temperature, the water vapor and the exhaust gas can be directly removed from the electrode chamber. In addition, when the temperature in the electrode chamber is equal to or lower than the prescribed temperature, such as at the time of cold starting of the engine or the like, it is possible to suppress the water vapor and the exhaust gas from coming into the electrode chamber.

In the present invention, an end of the ventilation passage, which is at an opposite side of an end thereof connected to a main body of the electric heating catalyst, may be connected to an intake passage of the internal combustion engine. According to this, it is possible to achieve the ventilation of the electrode chamber by making use of negative pressure in the intake passage.

Advantageous Effect of the Invention

According to the present invention, a decrease in the insulation resistance between the electrodes and the case in the EHC can be suppressed.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Schematic Construction of an EHC

Figure 1:
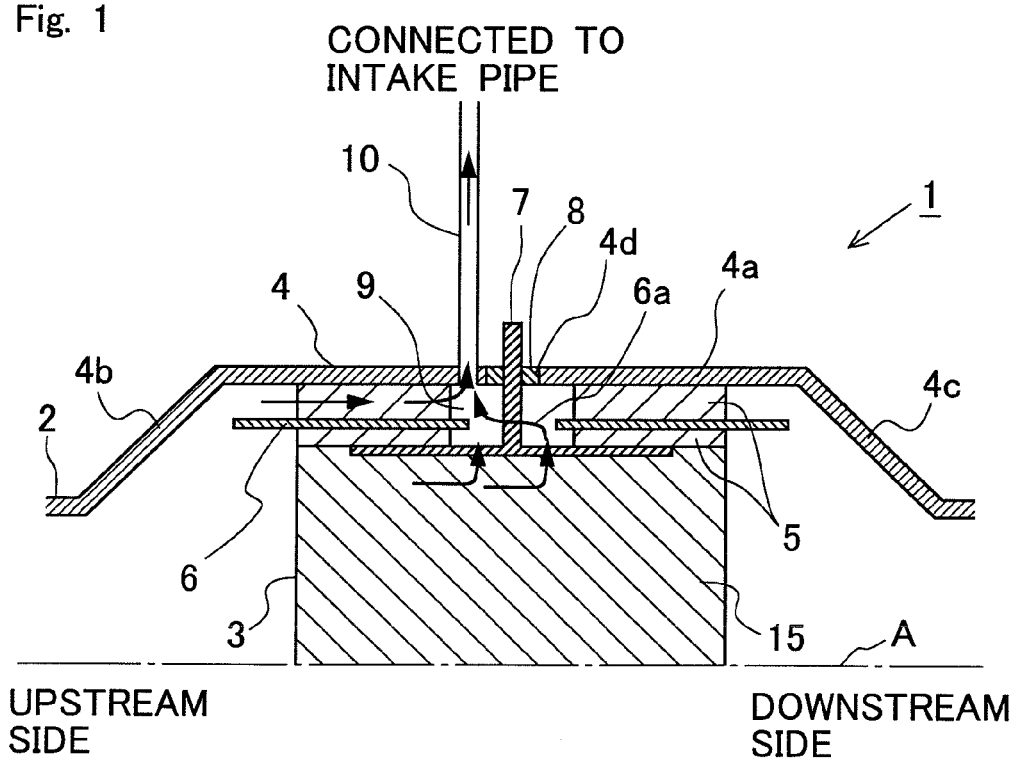
FIG. 1 is a view showing the schematic construction of an EHC according to a first embodiment.

FIG. 1 is a view showing the schematic construction of an electric heating catalyst (EHC) according to this first embodiment of the present invention. The EHC 1 according to this embodiment is arranged in an exhaust pipe or passage of an internal combustion engine mounted on a vehicle. The internal combustion engine may be a diesel engine, or may be a gasoline engine. In addition, the EHC according to this embodiment can also be used in a vehicle which adopts a hybrid system with an electric motor.

FIG. 1 is a cross sectional view which shows the EHC 1 cut in a longitudinal direction thereof along a central axis A of the exhaust pipe 2 of the internal combustion engine. Here, note that the shape of the EHC 1 is in line symmetry with respect to the central axis A, and hence, in FIG. 1, only an upper part of the EHC 1 is shown for the sake of convenience.

The EHC 1 according to this embodiment is provided with a catalyst carrier 3, a case 4, a mat 5, an inner pipe 6, electrodes 7, and a ventilation passage 10. The catalyst carrier 3 is formed in the shape of a cylinder, and is arranged in such a manner that a central axis thereof is in alignment with the central axis A of the exhaust pipe 2. An exhaust gas purification catalyst 15 is carried or supported by the catalyst carrier 3. As the exhaust gas purification catalyst 15, there can be exemplified an oxidation catalyst, an NOx storage reduction catalyst, an NOx selective reduction catalyst, a three-way catalyst, and so on.

The catalyst carrier 3 is formed of a material which, when energized, becomes an electric resistance to generate heat. As a material for the catalyst carrier 3, there can be exemplified SiC. The catalyst carrier 3 has a plurality of passages which extend in a direction in which an exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the case 4.

The catalyst carrier 3 is received in the case 4. An electrode chamber 9 is formed in the case 4. One pair of electrodes 7 (only one electrode being illustrated in FIG. 1) are connected to the catalyst carrier 3 through the electrode chamber 9. Electricity is supplied to the electrodes 7 from a battery (not shown). When electricity is supplied to the electrode 7, the catalyst carrier 3 is electrically energized. When the catalyst carrier 3 generates heat by energization thereof, the exhaust gas purification catalyst 15 supported by the catalyst carrier 3 is heated, so that the activation thereof is facilitated.

The case 4 is formed of metal. As a material which forms the case 4, there can be exemplified a stainless steel material. The case 4 has a reception portion 4a which is constructed to include a curved surface parallel to the central axis A, and tapered portions 4b, 4c which serve to connect the reception portion 4a and the exhaust pipe 2 with each other at an upstream side and a downstream side, respectively, of the reception portion 4a. The reception portion 4a has a passage cross sectional area which is larger than that of the exhaust pipe 2, and the catalyst carrier 3, the mat 5, and the inner pipe 6 are received in the inside of the reception portion 4a. The tapered portions 4b, 4c each take a tapered shape of which the passage cross sectional area decreases in accordance with the increasing distance thereof from the reception portion 4a.

The mat 5 is inserted between an inner wall surface of the reception portion 4a of the case 4, and an outer peripheral surface of the catalyst carrier 3. In other words, inside the case 4, the catalyst carrier 3 is supported by the mat 5. In addition, the inner pipe 6 is inserted between the mat 5. In other words, the mat 5 is divided into a portion at the side of the case 4 and a portion at the side of the catalyst carrier 3 by means of the inner pipe 6.

The mat 5 is formed of an electric insulation material. As a material which forms the mat 5, there can be exemplified a ceramic fiber which includes alumina as a main component. The mat 5 is wound around the outer peripheral surface of the catalyst carrier 3 and the outer peripheral surface of the inner pipe 6. Due to the insertion of the mat 5 between the catalyst carrier 3 and the case 4, it is possible to suppress electricity from flowing into the case 4 at the time when the catalyst carrier 3 is energized.

The inner pipe 6 is formed of an electrically insulating material. Alumina can be exemplified as a material which forms the inner pipe 6. The inner pipe 6 is formed into a tubular shape with the central axis A being located as a center thereof. As shown in FIG. 1, the inner pipe 6 has a length in the direction of the central axis A longer than that of the mat 5. As a result, the inner pipe has an upstream side end and a downstream side end thereof protruded from an upstream side end face and a downstream side end face of the mat 5, respectively.

The case 4 and the inner pipe 6 have through holes 4d, 6a opened therein so as to allow the electrodes 7 to pass them, respectively. In addition, the mat 5 has a space formed therein so as to allow the electrodes 7 to pass them. The electrode chamber 9 is formed by such a space which is located between such the inner wall surface of the case 4 and the outer peripheral surface of the catalyst carrier 3, and which has a side wall surface thereof formed by the mat 5.

Support members 8, which serve to support the electrodes 7, respectively, are arranged in the through holes 4d which are opened in the case 4. The support members 8 are formed of an electrically insulating material, and are fitted with no gap between the case 4 and the electrodes 7.

In addition, the EHC 1 is provided with the ventilation passage 10 for ventilating the electrode chamber 9. The ventilation passage 10 has one end thereof connected to the electrode chamber 9, and the other end thereof connected to an intake pipe or passage (not shown) of the internal combustion engine.

Here, note that in this embodiment, the catalyst carrier 3 corresponds to a heat generation element according to the present invention. However, the heat generation element according to the present invention is not limited to a carrier which supports the catalyst, but instead the heat generation element may be a structure which is arranged at an upstream side of the catalyst, for example. In addition, in this embodiment, the case 4 corresponds to a case according to the present invention, and the mat 5 corresponds to an insulating member according to the present invention. Also, in this embodiment, the ventilation passage 10 corresponds to a ventilation passage according to the present invention.

[Operational Effects of the Construction of the EHC According to this Embodiment]

In FIG. 1, arrows indicate flows of exhaust gas, condensed water, and water vapor which has been generated due to the evaporation of condensed water. The exhaust gas flowing in the exhaust pipe 2 permeates into the mat 5 and the catalyst carrier 3. When the exhaust gas passes through the outer peripheral wall of the catalyst carrier 3 or the mat 5 and comes into the electrode chamber 9, the moisture in the exhaust gas may condense, thus generating condensed water in the electrode chamber 9. In addition, when condensed water is generated in the exhaust pipe 2 and this condensed water permeates into the mat 5 or the catalyst carrier 3, the condensed water which has passed through them may come into the electrode chamber 9.

If condensed water is present in the electrode chamber 9, it evaporates therein to generate water vapor. In addition, the condensed water, which has accumulated in the mat 5 or the catalyst carrier 3, may evaporate, and may come into the electrode chamber 9 in a state of water vapor. As the humidity in the electrode chamber 9 is raised by such water vapor, there is a fear that the insulation resistance between the electrodes 7 and the case 4 in the electrode chamber 9 may decrease to a large extent.

Accordingly, in this embodiment, the ventilation passage 10 is provided in the EHC 1, so that the electrode chamber 9 is ventilated through this ventilation passage 10. As mentioned above, the other end of the ventilation passage 10 is connected to the intake pipe of the internal combustion engine. As a result of this, gases in the electrode chamber 9 are drawn into the ventilation passage 10 under the action of negative pressure in the intake pipe. Accordingly, the electrode chamber 9 can be ventilated. Then, the water vapor and the exhaust gas can be removed from the electrode chamber 9 by means of this ventilation. As a result, it is possible to suppress the humidity in the electrode chamber 9 from becoming excessively high. Thus, according to this embodiment, it is possible to suppress the insulation resistance between the electrodes 7 and the case 4 in the electrode chamber 9 from being decreased, which would otherwise result from the water vapor generated by the evaporation of condensed water.

Here, note that the ventilation passage 10 does not necessarily need to be connected to the intake pipe. For example, a vacuum pump may be provided on the ventilation passage 10, so that the electrode chamber 9 can be ventilated by the operation of this vacuum pump.

Second Embodiment

Schematic Construction of an EHC

Figure 2:
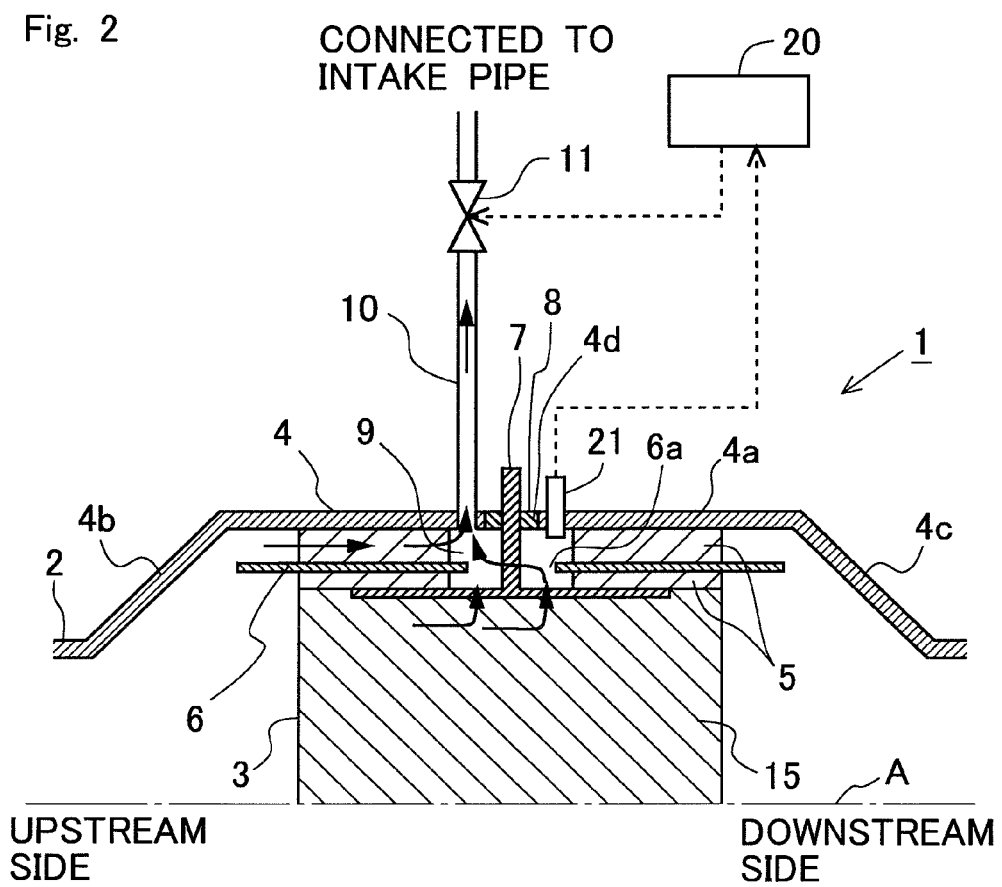
FIG. 2 is a view showing the schematic construction of an EHC according to a second embodiment.

FIG. 2 is a view showing the schematic construction of an EHC according to a second embodiment. In this embodiment, in an EHC 1a, there is provided a temperature sensor 21 that serves to detect the temperature in an electrode chamber 9. A detection value of this temperature sensor 21 is inputted to an electronic control unit (ECU) 20. In addition, a ventilation control valve 11 is arranged in a ventilation passage 10. The ventilation control valve 11 is controlled by the ECU 20. When the ventilation control valve 11 is turned on, the ventilation passage 10 is opened, whereas when the ventilation control valve 11 is turned off, the ventilation passage 10 is blocked or closed. The construction other than these is the same as that of the EHC according to the first embodiment. Here, note that in this embodiment, the temperature sensor 21 corresponds to a temperature acquisition part an according to the present invention. However, by means of the ECU 20, an amount of heat given to the electrode chamber 9 can be calculated based on an operating state of an internal combustion engine, and the temperature in the electrode chamber 9 can also be estimated from the amount of heat thus calculated. In this case, the ECU 20, which estimates the temperature in the electrode chamber 9, corresponds to the temperature acquisition part according to the present invention.

[Ventilation Control]

In this embodiment, when ventilation of the electrode chamber 9 is carried out, the interior of the electrode chamber 9 becomes negative pressure. As a result, there is a fear that the flow rate of an exhaust gas, which passes through a mat 5 or a catalyst carrier 3 to come into the electrode chamber 9, may increase. If the flow rate of the exhaust gas coming into the electrode chamber 9 increases, an increase in the condensed water, which is generated in the electrode chamber 9, will be caused. Accordingly, in this embodiment, ventilation control according to the temperature in the electrode chamber 9 is carried out so as to suppress the increase in the flow rate of the exhaust gas coming into the electrode chamber 9.

Figure 3:
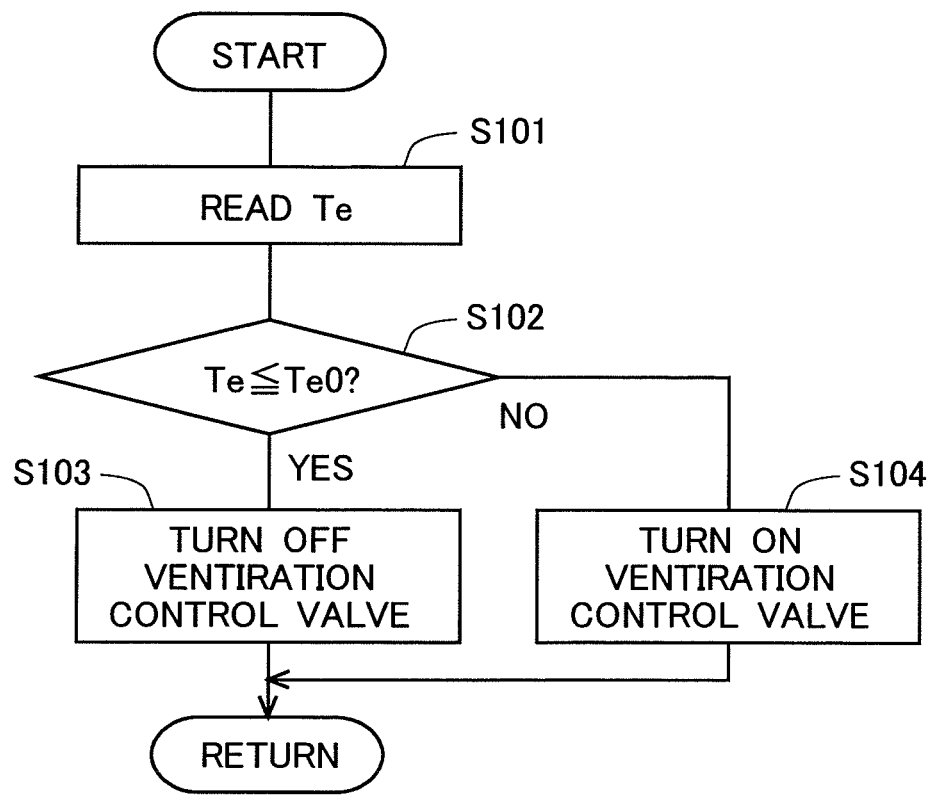
FIG. 3 is a flow chart showing a flow of ventilation control according to the second embodiment.

FIG. 3 is a flow chart showing a flow of ventilation control according to this second embodiment. This flow is beforehand stored in the ECU 20, and is carried out by the ECU 20 at predetermined intervals.

In this flow, first, in step S101, a temperature Te in the electrode chamber 9 detected by the temperature sensor 21 is read in. Then, in step S102, it is determined whether the temperature Te in the electrode chamber 9 is equal to or less than an open air temperature Te0. Here, in this embodiment, this open air temperature Te0 corresponds to a prescribed temperature according to the present invention. However, the prescribed temperature according to the present invention is not limited to the open air temperature.

In cases where it is determined, in step S102, that the temperature Te in the electrode chamber 9 is equal to or less than the open air temperature Te0, then in step S103, the ventilation control valve 11 is turned off. As a result of this, the ventilation passage 10 is blocked. In this case, the ventilation of the electrode chamber 9 is not carried out.

On the other hand, in cases where it is determined, in step S102, that the temperature Te in the electrode chamber 9 is higher than the open air temperature Te0, then in step S104, the ventilation control valve 11 is turned on. As a result of this, the ventilation passage 10 is opened, so that the ventilation of the electrode chamber 9 is carried out.

[Operational Effects of the Ventilation Control According to this Embodiment]

When the temperature in the electrode chamber 9 is equal to or lower than the open air temperature, condensed water, even if present in the electrode chamber 9, will not evaporate. As a result, the possibility that the humidity in the electrode chamber 9 is made excessively high due to water vapor is low. According to the above-mentioned flow, in such a case, the ventilation of the electrode chamber 9 is not carried out. Then, when the temperature in the electrode chamber 9 is higher than the open air temperature, i.e., only when the condensed water evaporates to generate water vapor in the electrode chamber 9, the ventilation of the electrode chamber 9 is carried out. Thus, according to the ventilation control of this embodiment, an increase in the flow rate of the exhaust gas coming into the electrode chamber 9 accompanying the ventilation thereof can be suppressed as much as possible.

Third Embodiment

Schematic Construction of an EHC

Figure 4:
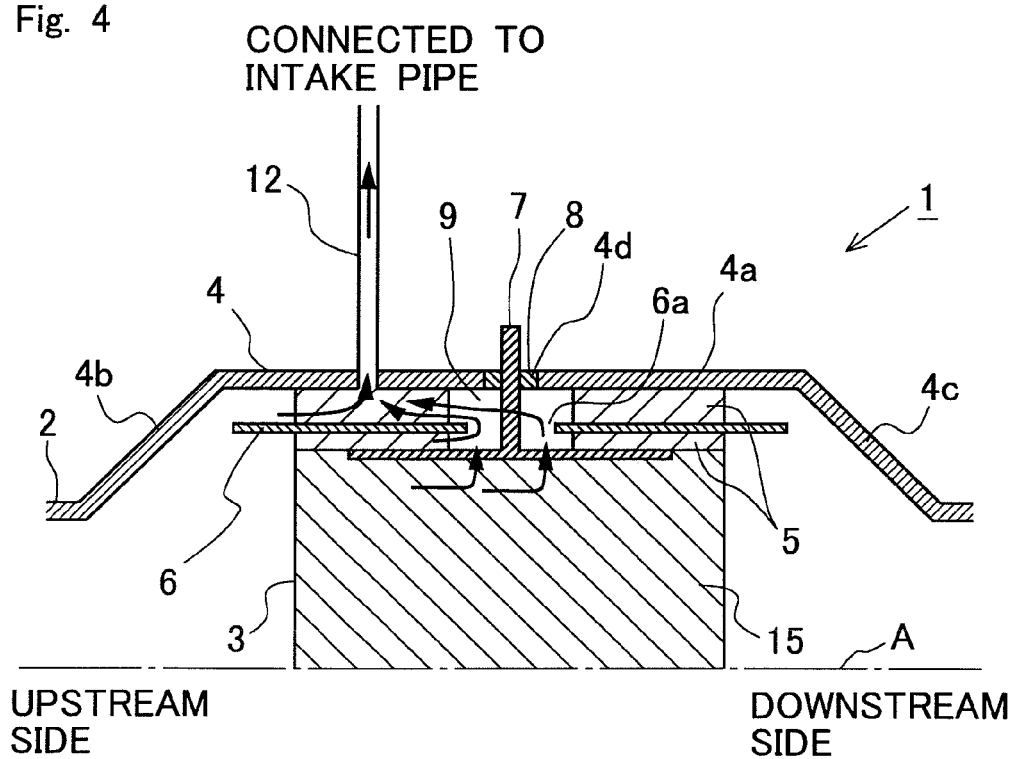
FIG. 4 is a view showing the schematic construction of an EHC according to a third embodiment.

FIG. 4 is a view showing the schematic construction of an EHC according to a third embodiment. In this embodiment, a ventilation passage is not directly connected to an electrode chamber 9, unlike the first embodiment. In this embodiment, a ventilation passage 12 is connected to a part of a case 4 in which a mat 5 exists at an upstream side of the electrode chamber 9. The construction other than this is the same as that of the EHC according to the first embodiment.

[Operational Effects of the Construction of the EHC According to this Embodiment]

In FIG. 4, too, arrows indicate flows of exhaust gas, condensed water, and water vapor which has been generated due to the evaporation of condensed water. According to this embodiment, by performing ventilation through the ventilation passage 12, the water vapor and the exhaust gas, which have permeated into the mat 5 from an upstream side thereof along the flow of the exhaust gas, are drawn into the ventilation passage 12 before they reach the electrode chamber 9. In other words, the water vapor and the exhaust gas before coming into the electrode chamber 9 can be removed. Accordingly, it is possible to suppress the water vapor and the exhaust gas from coming into the electrode chamber 9. As a result, the generation of condensed water in the electrode chamber 9 can be suppressed. Also, even in the case of this embodiment, the water vapor and the exhaust gas which have once come into the electrode chamber 9 can be removed through the mat 5.

Fourth Embodiment

Schematic Construction of an EHC

Figure 5:
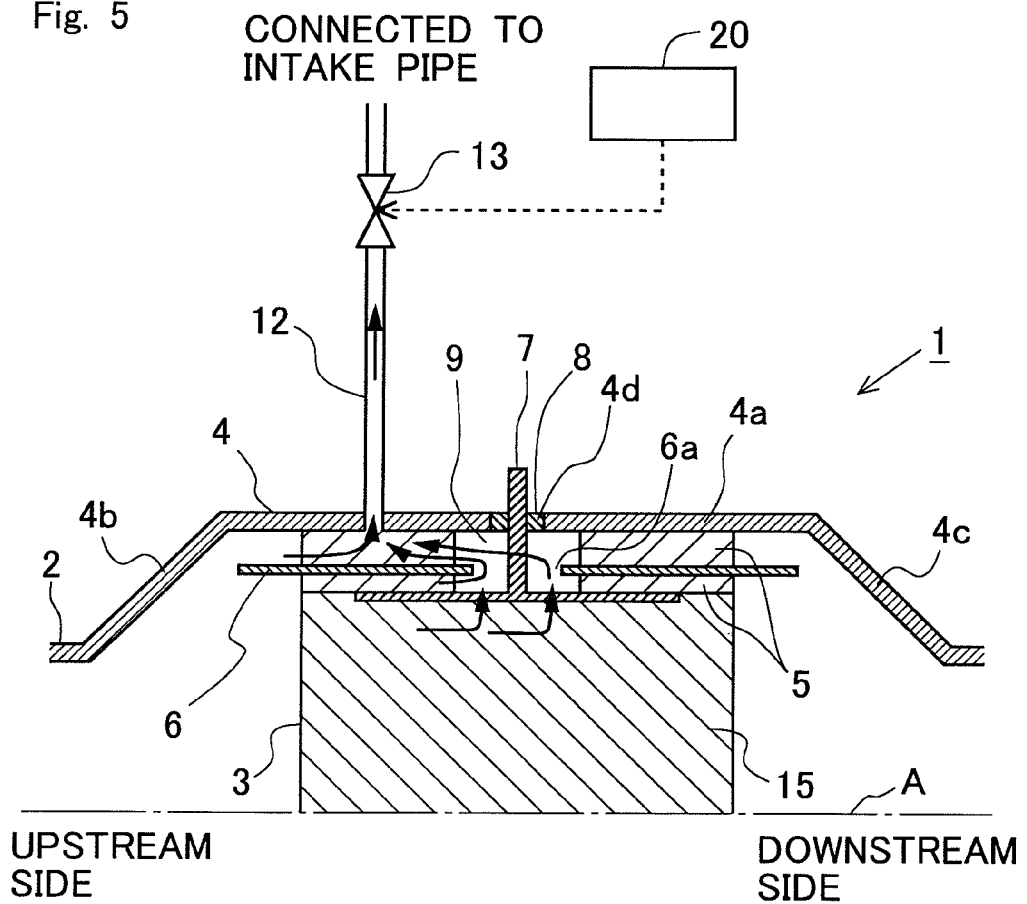
FIG. 5 is a view showing the schematic construction of an EHC according to a fourth embodiment.

FIG. 5 is a view showing the schematic construction of an EHC according to a fourth embodiment. In this embodiment, a ventilation control valve 13 is arranged in a ventilation passage 12. The ventilation control valve 13 is controlled by an ECU 20. When the ventilation control valve 13 is turned on, the ventilation passage 12 is opened, whereas when the ventilation control valve 13 is turned off, the ventilation passage 12 is blocked or closed. The construction other than this is the same as that of the EHC according to the third embodiment.

[Ventilation Control]

Figure 6:
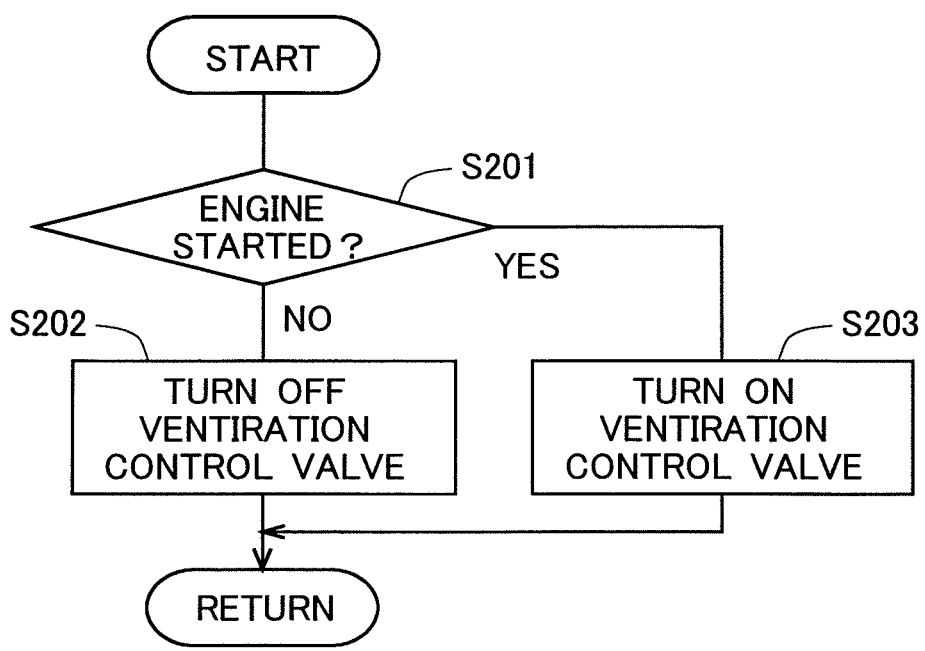
FIG. 6 is a flow chart showing a flow of ventilation control according to the fourth embodiment.

FIG. 6 is a flow chart showing a flow of ventilation control according to this fourth embodiment. This flow is beforehand stored in the ECU 20, and is carried out by the ECU 20 at predetermined intervals.

In this flow, first in step S201, it is determined whether an internal combustion engine to which an exhaust pipe 2 is connected has been started. In cases where it is determined, in step S201, that the internal combustion engine has not been started, then in step S202, the ventilation control valve 13 is turned off. As a result of this, the ventilation passage 12 is blocked. In this case, the ventilation of an electrode chamber 9 is not carried out.

on the other hand, in cases where it is determined, in step S201, that the internal combustion engine has been started, then in step S203, the ventilation control valve 13 is turned on. As a result of this, the ventilation passage 12 is opened, so that the ventilation of the electrode chamber 9 is carried out.

[Operational Effects of the Ventilation Control According to this Embodiment]

In cases where the internal combustion engine has performed a cold start, the temperature in the electrode chamber 9 is low, so immediately after the starting of the engine, the evaporation of condensed water in the electrode chamber 9 does not take place. However, even in such a situation, the exhaust gas having passed through the mat 5 comes into the electrode chamber 9, and hence, condensed water is generated. Then, the condensed water thus generated evaporates in accordance with a temperature rise in the electrode chamber 9, whereby water vapor is generated. According to the above-mentioned flow, even at the time of the cold start, ventilation through the ventilation passage 12 is started from the time when the internal combustion engine has been started. In other words, it is possible to suppress the water vapor and the exhaust gas from coming into the electrode chamber 9, from the time of the starting of the internal combustion engine. Accordingly, the generation of water vapor in the electrode chamber 9 after the completion of the starting of the internal combustion engine can be suppressed.

Fifth Embodiment

Schematic Construction of an EHC

Figure 7:
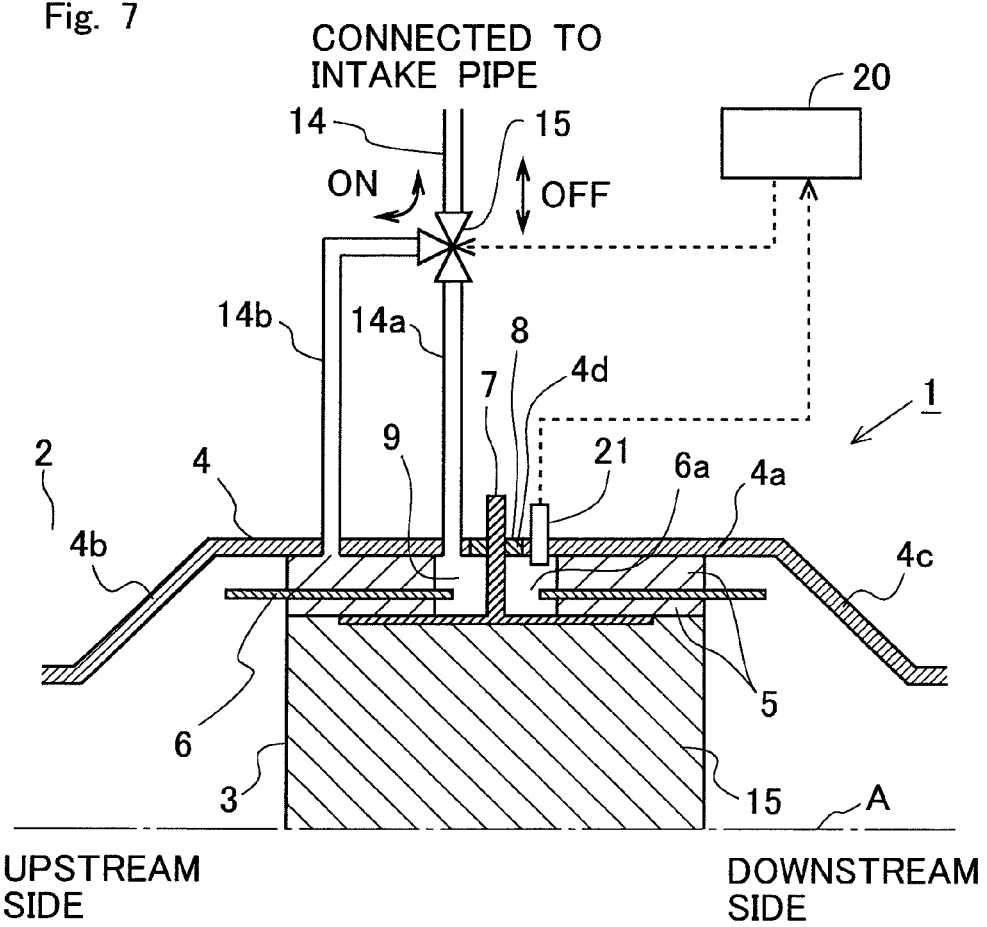
FIG. 7 is a view showing the schematic construction of an EHC according to a fifth embodiment.

FIG. 7 is a view showing the schematic construction of an EHC according to a fifth embodiment. In this embodiment, similar to the second embodiment, in an EHC 1, there is provided a temperature sensor 21 that serves to detect the temperature in an electrode chamber 9. A detection value of this temperature sensor 21 is inputted to an ECU 20. In addition, in this embodiment, a ventilation passage 14 branches on the way into a first ventilation passage 14a and a second ventilation passage 14b. Then, the first ventilation passage 14a is connected to the electrode chamber 9, and the second ventilation passage 14b is connected to a part of a case 4 in which a mat 5 exists at an upstream side of the electrode chamber 9.

A ventilation control valve 15 is arranged at a branch point at which the ventilation passage 14 branches into the first ventilation passage 14a and the second ventilation passage 14b. The ventilation control valve 15 is a three-way valve, and is controlled by the ECU 20. When the ventilation control valve 15 is turned on, the second ventilation passage 14b is opened, whereas when the ventilation control valve 15 is turned off, the first ventilation passage 14a is opened. The construction other than these is the same as that of the EHC according to the first embodiment. Here, note that in this embodiment, too, by means of the ECU 20, an amount of heat given to the electrode chamber 9 may be calculated based on an operating state of an internal combustion engine, and the temperature in the electrode chamber 9 may also be estimated from the amount of heat thus calculated.

[Ventilation Control]

Figure 8:
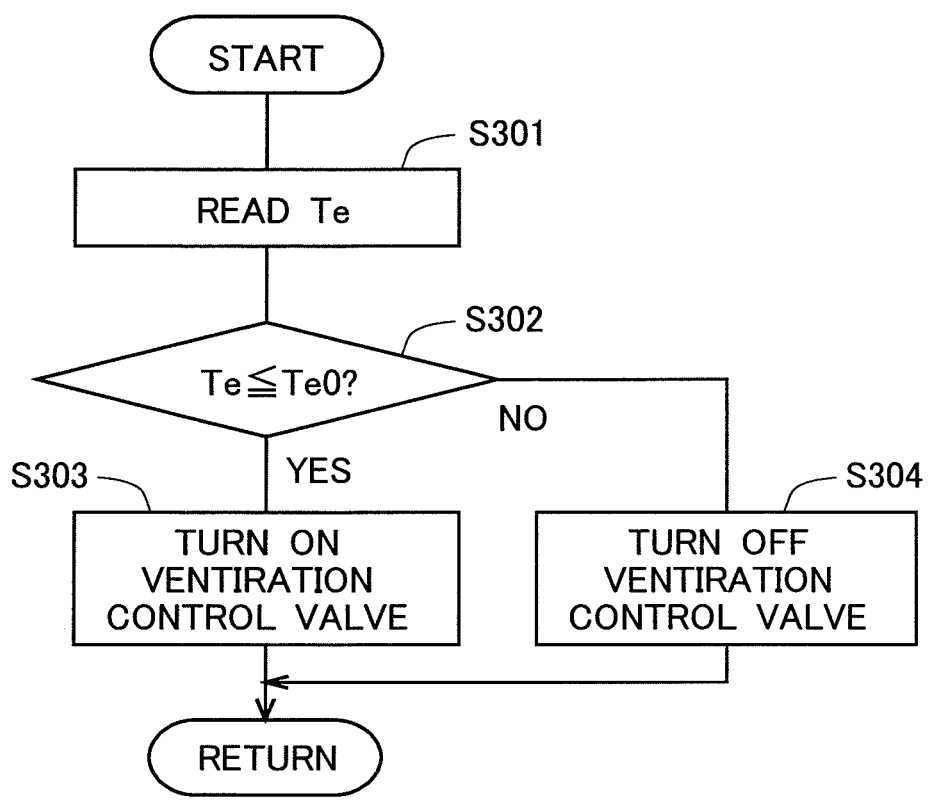
FIG. 8 is a flow chart showing a flow of ventilation control according to the fifth embodiment.

FIG. 8 is a flow chart showing a flow of ventilation control according to this fifth embodiment. This flow is beforehand stored in the ECU 20, and is carried out by the ECU 20 at predetermined intervals.

In this flow, first, in step S301, a temperature Te in the electrode chamber 9 detected by the temperature sensor 21 is read in. Then, in step S302, it is determined whether the temperature Te in the electrode chamber 9 is equal to or less than an open air temperature Te0. Here, note that in this embodiment, this open air temperature Te0 corresponds to a prescribed temperature according to the present invention. However, the prescribed temperature according to the present invention is not limited to the open air temperature.

In cases where it is determined, in step S302, that the temperature Te in the electrode chamber 9 is equal to or less than the open air temperature Te0, then in step S303, the ventilation control valve 15 is turned on. As a result of this, the second ventilation passage 14b is opened, and the ventilation of the electrode chamber 9 is carried out through the second ventilation passage 14b.

On the other hand, in cases where it is determined, in step S302, that the temperature Te in the electrode chamber 9 is higher than the open air temperature Te0, then in step S304, the ventilation control valve 15 is turned off. As a result of this, the first ventilation passage 14a is opened, and the ventilation of the electrode chamber 9 is carried out through the first ventilation passage 14a.

[Operational Effects of the Ventilation Control According to this Embodiment]

According to the above-mentioned flow, when the evaporation of condensed water in the electrode chamber 9 does not take place, such as at the time of cold starting of the engine, ventilation through the second ventilation passage 14b is carried out. As a result of this, similar to the third and fourth embodiments, it is possible to suppress the water vapor and the exhaust gas from coming into the electrode chamber 9. On the other hand, when the evaporation of condensed water takes place in the electrode chamber 9, ventilation through the first ventilation passage 14a is carried out. Thus, similar to the first and second embodiments, the water vapor and the exhaust gas can be directly removed from the electrode chamber 9.

Here, note that in this embodiment, the ventilation passage 14 may not necessarily be constructed to branch on the way. For example, the first and second ventilation passages 14a, 14b may be connected to an intake pipe separately from each other, and a ventilation control valve may be arranged in each of these ventilation passages.

DESCRIPTION OF THE REFERENCE SIGNS

1 . . . electric heating catalyst (EHC)
3 . . . catalyst carrier

4 . . . case
5 . . . mat
6 . . . inner pipe
7 . . . electrodes
9 . . . electrode chamber
10, 12, 14 . . . ventilation passages
11, 13, 15 . . . ventilation control valves

The invention claimed is:

1. An electric heating catalyst which is arranged in an exhaust passage of an internal combustion engine, said catalyst comprising:
 a heat generation element that is electrically energized to generate heat so that a catalyst is heated by the generation of heat;
 a case that receives said heat generation element therein;
 an insulating member that is arranged between said heat generation element and said case for supporting said heat generation element and insulating electricity;
 electrodes that are connected to said heat generation element through an electrode chamber which is a space located between an inner wall surface of said case and an outer peripheral surface of said heat generation element, and which is formed in said insulating member, and which has a side wall surface formed by said insulating member, said electrodes supplying electricity to said heat generation element; and
 a ventilation passage that ventilates said electrode chamber,
 wherein an end of said ventilation passage is connected to an intake passage of the internal combustion engine, and an other end is connected to a main body of said electric heating catalyst.

2. The electric heating catalyst as set forth in claim 1, wherein said ventilation passage is connected to said electrode chamber.

3. The electric heating catalyst as set forth in claim 1, wherein said ventilation passage is connected to a part of the case in which said insulating member exists at an upstream side of said electrode chamber.

4. The electric heating catalyst as set forth in claim 3, further comprising:
 an electric control unit configured to start ventilation of said electrode chamber by way of said ventilation passage at the time of starting of the internal combustion engine.

5. An electric heating catalyst which is arranged in an exhaust passage of an internal combustion engine, said catalyst comprising:
 a heat generation element that is electrically energized to generate heat so that a catalyst is heated by the generation of heat;
 a case that receives said heat generation element therein;
 an insulating member that is arranged between said heat generation element and said case for supporting said heat generation element and insulating electricity;
 electrodes that are connected to said heat generation element through an electrode chamber which is a space located between an inner wall surface of said case and an outer peripheral surface of said heat generation element, and which is formed in said insulating member, and which has a side wall surface formed by said insulating member, said electrodes supplying electricity to said heat generation element;
 a ventilation passage that ventilates said electrode chamber, wherein said ventilation passage is connected to said electrode chamber;
 a temperature acquisition part that acquires a temperature in said electrode chamber; and
 an electric control unit configured to carry out ventilation of said electrode chamber by way of said ventilation passage when the temperature in said electrode chamber acquired by said temperature acquisition part is higher than a prescribed temperature.

6. An electric heating catalyst, which is arranged in an exhaust passage of an internal combustion engine, said catalyst comprising:
 a heat generation element that is electrically energized to generate heat so that a catalyst is heated by the generation of heat;
 a case that receives said heat generation element therein;
 an insulating member that is arranged between said heat generation element and said case for supporting said heat generation element and insulating electricity;
 electrodes that are connected to said heat generation element through an electrode chamber which is a space located between an inner wall surface of said case and an outer peripheral surface of said heat generation element, and which is formed in said insulating member, and which has a side wall surface formed by said insulating member, said electrodes supplying electricity to said heat generation element; and
 a ventilation passage that ventilates said electrode chamber,
 wherein said ventilation passage has:
 a first ventilation passage that is connected to said electrode chamber; and
 a second ventilation passage that is connected to a part of the case in which said insulating member exists at an upstream side of said electrode chamber; and
 wherein said electric heating catalyst further comprises:
 a temperature acquisition part that acquires a temperature in said electrode chamber; and
 an electric control unit configured to carry out ventilation of said electrode chamber by way of said first ventilation passage when the temperature in said electrode chamber acquired by said temperature acquisition part is higher than a prescribed temperature, and carries out ventilation of said electrode chamber by way of said second ventilation passage when said temperature is equal to or lower than said prescribed temperature.

* * * * *